United States Patent
Ji et al.

(10) Patent No.: US 9,423,007 B2
(45) Date of Patent: Aug. 23, 2016

(54) MULTI-STAGE TRANSMISSION FOR VEHICLE

(71) Applicant: Hyundai Motor Company, Seoul (KR)

(72) Inventors: Seong Wook Ji, Ansan-si (KR); Jae Chang Kook, Hwaseong-si (KR); Seong Wook Hwang, Gunpo-si (KR); Hyu Tae Shim, Hwaseong-si (KR); Won Min Cho, Hwaseong-si (KR); Kang Soo Seo, Yongin-si (KR); Myeong Hoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/713,259

(22) Filed: May 15, 2015

(65) Prior Publication Data
US 2016/0169329 A1    Jun. 16, 2016

(30) Foreign Application Priority Data

Dec. 10, 2014    (KR) .......................... 10-2014-0177169

(51) Int. Cl.
*F16H 3/66*    (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
CPC ....................................................... F16H 3/66
See application file for complete search history.

(56) References Cited

U.S. PATENT DOCUMENTS 8,303,455 B2    11/2012    Gumpoltsberger et al.

FOREIGN PATENT DOCUMENTS

| JP | 2014-500462 A | 1/2014 |
| KR | 10-2011-0131816 A | 12/2011 |
| KR | 10-2013-0077146 A | 7/2013 |
| WO | WO 2012/084375 A1 | 6/2012 |

*Primary Examiner* — Derek D Knight
(74) *Attorney, Agent, or Firm* — Morgan, Lewis & Bockius LLP

(57) ABSTRACT

A multi-stage transmission for a vehicle may include an input shaft, an output shaft, first, second, third, and fourth planetary gear devices disposed between the input shaft and the output shaft to transmit rotary force, each of the first, second, third, and fourth planetary gear devices having three rotary elements, and at least six shifting elements connected to the three rotary elements of the first, second, third, and fourth planetary gear devices.

7 Claims, 2 Drawing Sheets

FIG. 2

| SHIFTING POSITION | CL1 | CL2 | CL3 | CL4 | B1 | B2 | GEAR RATIO |
|---|---|---|---|---|---|---|---|
| 1ST | O | O | | | | O | 5.621 |
| 2ND | | O | | O | | O | 3.014 |
| 3RD | O | | | O | | O | 2.473 |
| 4TH | | | | O | O | O | 2.047 |
| 5TH | | | O | O | | O | 1.390 |
| 6TH | | | O | O | O | | 1.081 |
| 7TH | O | | O | O | | | 1.000 |
| 8TH | O | | O | | O | | 0.863 |
| 9TH | O | O | | | O | | 0.766 |
| 10TH | | O | | O | O | | 0.564 |
| R1 | O | | O | | | O | 3.820 |

MULTI-STAGE TRANSMISSION FOR VEHICLE

CROSS-REFERENCE TO RELATED APPLICATION

The present application claims priority to Korean Patent Application No. 10-2014-0177169, filed on Dec. 10, 2014, the entire contents of which is incorporated herein for all purposes by this reference.

BACKGROUND OF THE INVENTION

1. Field of the Invention

The present invention generally relates to a multi-stage transmission for a vehicle and, more particularly, to a multi-stage transmission technology able to realize as many shifting stages as possible using the fewest parts possible and the simplest configuration possible, thereby improving fuel efficiency of a vehicle.

2. Description of Related Art

Recent rising oil prices have driven worldwide car manufacturers into unlimited competition to improve fuel efficiency. In addition, great efforts have been made to reduce the weight and improve the fuel efficiency of engines based on a variety of techniques such as downsizing.

Among methods that can be sought for transmissions equipped in vehicles to improve fuel efficiency, there is a method allowing an engine to operate at more efficient operation points using a multi-stage transmission, thereby ultimately improving the fuel efficiency.

Such a multi-stage transmission allows an engine to operate in a relatively low RPM (revolutions per minute) range, thereby further improving the quietness of a vehicle.

However, as the number of shifting stages of a transmission increases, the number of internal parts constituting the transmission also increases. This may lead to undesirable effects instead, such as the reduced mountability and transfer efficiency and the increased cost and weight of the transmission. Therefore, in order to maximize the effect of improved fuel efficiency using the multi-staging of a transmission, it is important to devise a transmission structure able to realize maximum efficiency using a relatively small number of parts and a simple configuration.

The information disclosed in the Background of the Invention section is only for the enhancement of understanding of the background of the invention, and should not be taken as an acknowledgment or as any form of suggestion that this information forms a prior art that would already be known to a person skilled in the art.

BRIEF SUMMARY

Various aspects of the present invention are directed to providing a multi-stage transmission for a vehicle that is able to realize at least ten forward shifting stages and one reverse shifting stage with a relatively small number of parts and a simple configuration such that an engine may be operated at optimum operation points, thereby maximizing an improvement in the fuel efficiency of the vehicle, and the engine may be operated more quietly, thereby improving the quietness of the vehicle.

In an aspect of the present invention, a multi-stage transmission for a vehicle may include an input shaft, an output shaft, first, second, third, and fourth planetary gear devices disposed between the input shaft and the output shaft to transmit rotary force, each of the first, second, third, and fourth planetary gear devices having three rotary elements, and at least six shifting elements connected to the three rotary elements of the first, second, third, and fourth planetary gear devices, wherein a first rotary element of the first planetary gear device is installed to be fixable by a first shifting element of the at least six shifting elements and selectively connected to a first rotary element of the second planetary gear device, a second rotary element of the first planetary gear device is directly connected to the input shaft and selectively the first rotary element of the second planetary gear device, and a third rotary element of the first planetary gear device is continuously connected to a first rotary element of the third planetary gear device, wherein a second rotary element of the second planetary gear device is selectively connected to each of the first rotary element of the third planetary gear device and a third rotary element of the third planetary gear device, and a third rotary element of the second planetary gear device is continuously connected to a second rotary element of the third planetary gear device, wherein the first rotary element of the third planetary gear device is continuously connected to a first rotary element of the fourth planetary gear device and the second rotary element of the third planetary gear device is continuously connected to a third rotary element of the fourth planetary gear device, and wherein the third rotary element of the fourth planetary gear device is installed to be fixable by a second shifting element of the at least six shifting elements and a second rotary element of the fourth planetary gear device is directly connected to the output shaft.

The first planetary gear device, the second planetary gear device, the third planetary gear device and the fourth planetary gear device are sequentially arranged along an axial direction of the input shaft and the output shaft.

The first rotary element of the first planetary gear device is installed to be fixable to a transmission case by a first brake among the at least six shifting elements, wherein the third rotary element of the fourth planetary gear device is installed to be fixable to the transmission case by a second brake among the at least six shifting elements, and wherein remaining shifting elements among the at least six shifting elements are configured to constitute variable connection structures between the three rotary elements of the first, second, third, and fourth planetary gear devices.

A first clutch among the at least six shifting elements forms a variable connection structure between the second rotary element of the first planetary gear device and the first rotary element of the second planetary gear device, wherein a second clutch among the at least six shifting elements forms a variable connection structure between the second rotary element of the second planetary gear device and the first rotary element of the third planetary gear device, wherein a third clutch among the at least six shifting elements forms a variable connection structure between the second rotary element of the second planetary gear device and the third rotary element of the third planetary gear device, and wherein a fourth clutch among the at least six shifting elements forms a variable connection structure between the first rotary element of the first planetary gear device and the first rotary element of the second planetary gear device.

In another aspect of the present invention, a multi-stage transmission for a vehicle may include first, second, third, and fourth planetary gear devices each having three rotary elements, six shifting elements configured to selectively provide frictional force, and first, second, third, fourth, fifth, sixth, seventh, and eighth rotary shafts connected to the three rotary elements of the first, second, third, and fourth planetary gear devices, wherein the first rotary shaft is an input shaft directly connected to a second rotary element of the first planetary gear device, the second rotary shaft is directly connected to a first rotary element of the first planetary gear device, the third rotary shaft is directly connected to a first rotary element of the second planetary gear device, the fourth rotary shaft is directly connected to a third rotary element of the first planetary gear device, a first rotary element of the third planetary gear device and a first rotary element of the fourth planetary gear device, the fifth rotary shaft is directly connected to a second rotary element of the second planetary gear device, the sixth rotary shaft is directly connected to a third rotary element of the second planetary gear device, a second rotary element of the third planetary gear device and a third rotary element of the fourth planetary gear device, the seventh rotary shaft is directly connected to a third rotary element of the third planetary gear device, the eighth rotary shaft is an output shaft directly connected to a second rotary element of the fourth planetary gear device, and wherein the six shifting elements may include first, second, third, and fourth clutches and first and second brakes, the first clutch is disposed between the first rotary shaft and the third rotary shaft, the second clutch is disposed between the fourth rotary shaft and the fifth rotary shaft, the third clutch is disposed between the fifth rotary shaft and the seventh rotary shaft, the fourth clutch is disposed between the second rotary shaft and the third rotary shaft, the first brake is disposed between the second rotary shaft and a transmission case, and the second brake is disposed between the sixth rotary shaft and the transmission case.

The first planetary gear device, the second planetary gear device, the third planetary gear device and the fourth planetary gear device are sequentially arranged along an axial direction of the input shaft and the output shaft.

The first clutch is disposed to form a variable connection between the second rotary element of the first planetary gear device and the first rotary element of the second planetary gear device, the second clutch is disposed to form a variable connection between the second rotary element of the second planetary gear device and the first rotary element of the third planetary gear device, the third clutch is disposed to form a variable connection between the second rotary element of the second planetary gear device and the third rotary element of the third planetary gear device, and the fourth clutch is disposed to form a variable connection between the first rotary element of the first planetary gear device and the first rotary element of the second planetary gear device.

According to the present invention as set forth above, the multi-stage transmission for a vehicle can realize at least ten forward shifting stages and one reverse shifting stage with a relatively small number of parts and a simple configuration such that the engine may be operated at optimum operation points, thereby maximizing an improvement in the fuel efficiency of the vehicle, and the engine may be operated more quietly, thereby improving the quietness of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 illustrates an operation mode table of the transmission shown in FIG. 1.

Figure 1:
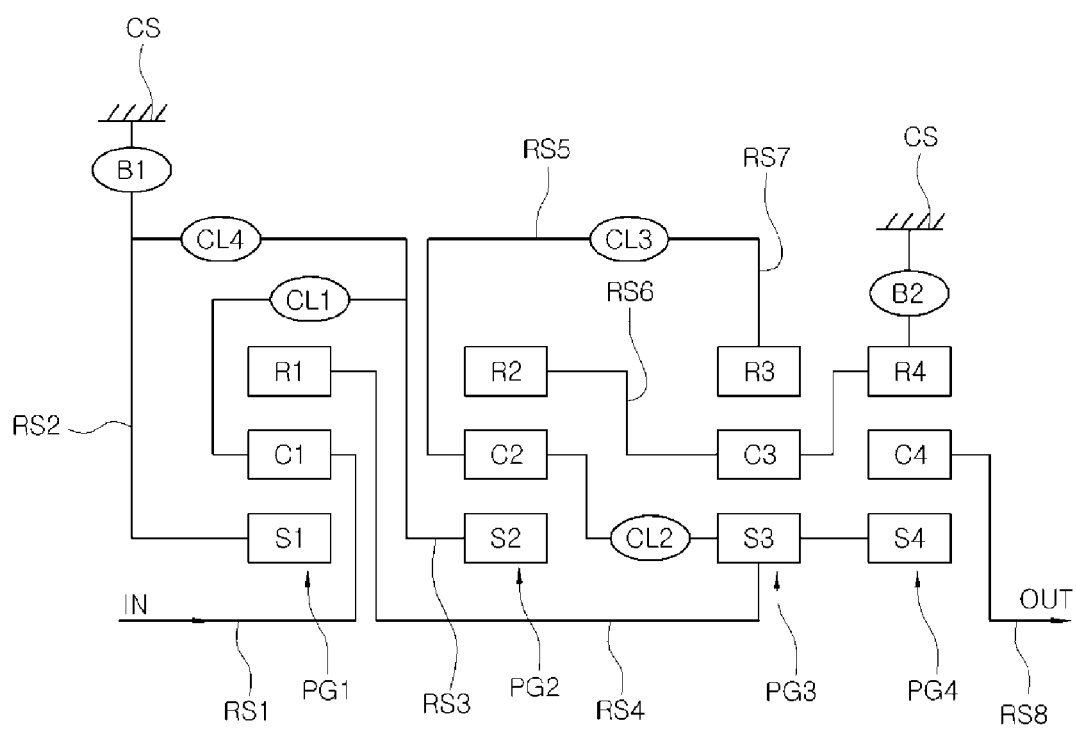
FIG. 1 is a diagram illustrating the configuration of a multi-stage transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF SPECIFIC EMBODIMENTS

Reference will now be made in greater detail to exemplary embodiments of a multi-stage transmission for a vehicle according to the present invention, examples of which are illustrated in the accompanying drawings. Wherever possible, the same reference numerals will be used throughout the drawings and the description to refer to the same or like parts.

Referring to FIGS. 1 and 2, a multi-stage transmission for a vehicle according to an exemplary embodiment of the present invention includes an input shaft IN; an output shaft OUT; first to fourth planetary gear devices PG1, PG2, PG3 and PG4 disposed between the input shaft IN and the output shaft OUT to transmit rotary force, each of the first to fourth planetary gear devices PG1 to PG4 having three rotary elements; and at least six shifting elements connected to the rotary elements of the first to fourth planetary gear devices PG1 to PG4.

A first rotary element S1 of the first planetary gear device PG1 is installed to be fixable by one rotary element of the at least six shifting elements and variably connected to a first rotary element S2 of the second planetary gear device PG2. A second rotary element C1 of the first planetary gear device PG1 is directly connected to the input shaft IN and variably connected to the first rotary element S2 of the second planetary gear device PG2. A third rotary element R1 of the first planetary gear device PG1 is permanently connected to a first rotary element S3 of the third planetary gear device PG3.

A second rotary element C2 of the second planetary gear device PG2 is variably connected to each of the first rotary element S3 and a third rotary element R3 of the third planetary gear device PG3, and a third rotary element R2 of the second planetary gear device PG2 is permanently connected to a second rotary element C3 of the third planetary gear device PG3.

The first rotary element S3 of the third planetary gear device PG3 is permanently connected to a first rotary element S4 of the fourth planetary gear device PG4 and the second rotary element S3 of the third planetary gear device PG3 is permanently connected to a third rotary element R4 of the fourth planetary gear device PG4.

The third rotary element R4 of the fourth planetary gear device PG4 is installed to be fixable by another rotary element of the at least six shifting elements and a second rotary element C4 of the fourth planetary gear device PG4 is permanently connected to the output shaft OUT.

The first planetary gear device PG1, the second planetary gear device PG2, the third planetary gear device PG3 and the fourth planetary gear device PG4 are sequentially arranged along the axial direction of the input shaft IN and the output shaft OUT.

The first rotary element S1 of the first planetary gear device PG1 is installed to be fixable to a transmission case CS by means of a first brake B1 among the at least six shifting elements. The third rotary element R4 of the fourth planetary gear device PG4 is installed to be fixable to the transmission case CS by means of a second brake B2 among the at least six shifting elements.

Therefore, the first rotary element S1 of the first planetary gear device PG1 and the third rotary element R4 of the fourth planetary gear device PG4 may be converted to rotatable state or restrained state not to be rotated by means of the operations of the first brake B1 and the second brake B2, respectively.

The other shifting elements among the at least six shifting elements are configured to constitute variable connection structures between the rotary elements of the planetary gear devices.

Specifically, a first clutch CL1 among the at least six shifting elements forms a variable connection structure between the second rotary element C1 of the first planetary gear device PG1 and the first rotary element S2 of the second planetary gear device PG2. A second clutch CL2 among the at least six shifting elements forms a variable connection structure between the second rotary element C2 of the second planetary gear device PG2 and the first rotary element S3 of the third planetary gear device PG3. A third clutch CL3 among the at least six shifting elements forms a variable connection structure between the second rotary element C2 of the second planetary gear device PG2 and the third rotary element R3 of the third planetary gear device PG3. A fourth clutch CL4 among the at least six shifting elements forms a variable connection structure between the first rotary element S1 of the first planetary gear device PG1 and the first rotary element S2 of the second planetary gear device PG2.

According to this embodiment, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

The multi-stage transmission for a vehicle configured as above may also be presented as follows.

Specifically, the multi-stage transmission for a vehicle according to the present invention includes the first to fourth planetary gear devices PG1 to PG4 each having the three rotary elements; the six shifting elements configured to variably provide frictional force; and eight rotary shafts connected to the rotary elements of the first to fourth planetary gear devices.

Hence, among the eight rotary shafts, the first rotary shaft RS1 is the input shaft IN directly connected to the second rotary element C1 of the first planetary gear device PG1. The second rotary shaft RS2 is directly connected to the first rotary element S1 of the first planetary gear device PG1. The third rotary shaft RS3 is directly connected to the first rotary element S2 of the second planetary gear device PG2. The fourth rotary shaft RS4 is directly connected to the third rotary element R1 of the first planetary gear device PG1, the first rotary element S3 of the third planetary gear device PG3 and the first rotary element S4 of the fourth planetary gear device PG4. The fifth rotary shaft RS5 is directly connected to the second rotary element C2 of the second planetary gear device PG2. The sixth rotary shaft RS6 is directly connected to the third rotary element R2 of the second planetary gear device PG2, the second rotary element C3 of the third planetary gear device PG3 and the third rotary element R4 of the fourth planetary gear device PG4. The seventh rotary shaft RS7 is the third rotary element R3 of the third planetary gear device PG3. The eighth rotary shaft RS8 is the output shaft OUT directly connected to the second rotary element C4 of the fourth planetary gear device PG4.

In addition, among the six shifting elements, the first clutch CL1 is disposed between the first rotary shaft RS1 and the third rotary shaft RS3. The second clutch CL2 is disposed between the fourth rotary shaft RS4 and the fifth rotary shaft RS5. The third clutch CL3 is disposed between the fifth rotary shaft RS5 and the seventh rotary shaft RS7. The fourth clutch CL4 is disposed between the second rotary shaft RS2 and the third rotary shaft RS3. The first brake B1 is disposed between the second rotary shaft RS2 and a transmission case CS. The second brake B2 is disposed between the sixth rotary shaft RS6 and the transmission case CS.

As set forth above, the multi-stage transmission for a vehicle according to the present invention including the four simple planetary gear devices and the six shifting elements realizes ten forward shifting stages and one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle can contribute to the improved fuel efficiency and quietness of a vehicle, thereby ultimately improving the marketability of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage transmission for a vehicle comprising:
an input shaft;
an output shaft;
first, second, third, and fourth planetary gear devices disposed between the input shaft and the output shaft to transmit rotary force, each of the first, second, third, and fourth planetary gear devices having three rotary elements; and at least six shifting elements connected to the three rotary elements of the first, second, third, and fourth planetary gear devices, wherein a first rotary element of the first planetary gear device is installed to be fixable by a first shifting element of the at least six shifting elements and selectively connected to a first rotary element of the second planetary gear device, a second rotary element of the first planetary gear device is directly connected to the input shaft and selectively the first rotary element of the second planetary gear device, and a third rotary element of the first planetary gear device is continuously connected to a first rotary element of the third planetary gear device, wherein a second rotary element of the second planetary gear device is selectively connected to each of the first rotary element of the third planetary gear device and a third rotary element of the third planetary gear device, and a third rotary element of the second planetary gear device is continuously connected to a second rotary element of the third planetary gear device, wherein the first rotary element of the third planetary gear device is continuously connected to a first rotary element of the fourth planetary gear device and the second rotary element of the third planetary gear device is continuously connected to a third rotary element of the fourth planetary gear device, and wherein the third rotary element of the fourth planetary gear device is installed to be fixable by a second shifting element of the at least six shifting elements and a second rotary element of the fourth planetary gear device is directly connected to the output shaft.

2. The multi-stage transmission according to claim 1, wherein the first planetary gear device, the second planetary gear device, the third planetary gear device and the fourth planetary gear device are sequentially arranged along an axial direction of the input shaft and the output shaft.

3. The multi-stage transmission according to claim 2,
wherein the first rotary element of the first planetary gear device is installed to be fixable to a transmission case by a first brake among the at least six shifting elements,
wherein the third rotary element of the fourth planetary gear device is installed to be fixable to the transmission case by a second brake among the at least six shifting elements, and
wherein remaining shifting elements among the at least six shifting elements are configured to constitute variable connection structures between the three rotary elements of the first, second, third, and fourth planetary gear devices.

4. The multi-stage transmission according to claim 3,
wherein a first clutch among the at least six shifting elements forms a variable connection structure between the second rotary element of the first planetary gear device and the first rotary element of the second planetary gear device,
wherein a second clutch among the at least six shifting elements forms a variable connection structure between the second rotary element of the second planetary gear device and the first rotary element of the third planetary gear device,
wherein a third clutch among the at least six shifting elements forms a variable connection structure between the second rotary element of the second planetary gear device and the third rotary element of the third planetary gear device, and wherein a fourth clutch among the at least six shifting elements forms a variable connection structure between the first rotary element of the first planetary gear device and the first rotary element of the second planetary gear device.

5. A multi-stage transmission for a vehicle comprising:
first, second, third, and fourth planetary gear devices each having three rotary elements;
six shifting elements configured to selectively provide frictional force; and
first, second, third, fourth, fifth, sixth, seventh, and eighth rotary shafts connected to the three rotary elements of the first, second, third, and fourth planetary gear devices,
wherein the first rotary shaft is an input shaft directly connected to a second rotary element of the first planetary gear device, the second rotary shaft is directly connected to a first rotary element of the first planetary gear device, the third rotary shaft is directly connected to a first rotary element of the second planetary gear device, the fourth rotary shaft is directly connected to a third rotary element of the first planetary gear device, a first rotary element of the third planetary gear device and a first rotary element of the fourth planetary gear device, the fifth rotary shaft is directly connected to a second rotary element of the second planetary gear device, the sixth rotary shaft is directly connected to a third rotary element of the second planetary gear device, a second rotary element of the third planetary gear device and a third rotary element of the fourth planetary gear device, the seventh rotary shaft is directly connected to a third rotary element of the third planetary gear device, the eighth rotary shaft is an output shaft directly connected to a second rotary element of the fourth planetary gear device, and
wherein the six shifting elements include first, second, third, and fourth clutches and first and second brakes, the first clutch is disposed between the first rotary shaft and the third rotary shaft, the second clutch is disposed between the fourth rotary shaft and the fifth rotary shaft, the third clutch is disposed between the fifth rotary shaft and the seventh rotary shaft, the fourth clutch is disposed between the second rotary shaft and the third rotary shaft, the first brake is disposed between the second rotary shaft and a transmission case, and the second brake is disposed between the sixth rotary shaft and the transmission case.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein the first clutch is disposed to form a variable connection between the second rotary element of the first planetary gear device and the first rotary element of the second planetary gear device, the second clutch is disposed to form a variable connection between the second rotary element of the second planetary gear device and the first rotary element of the third planetary gear device, the third clutch is disposed to form a variable connection between the second rotary element of the second planetary gear device and the third rotary element of the third planetary gear device, and the fourth clutch is disposed to form a variable connection between the first rotary element of the first planetary gear device and the first rotary element of the second planetary gear device.

* * * * *